(No Model.)
A. D. ORDWAY.
BAKER'S OVEN.
No. 475,045. Patented May 17, 1892.
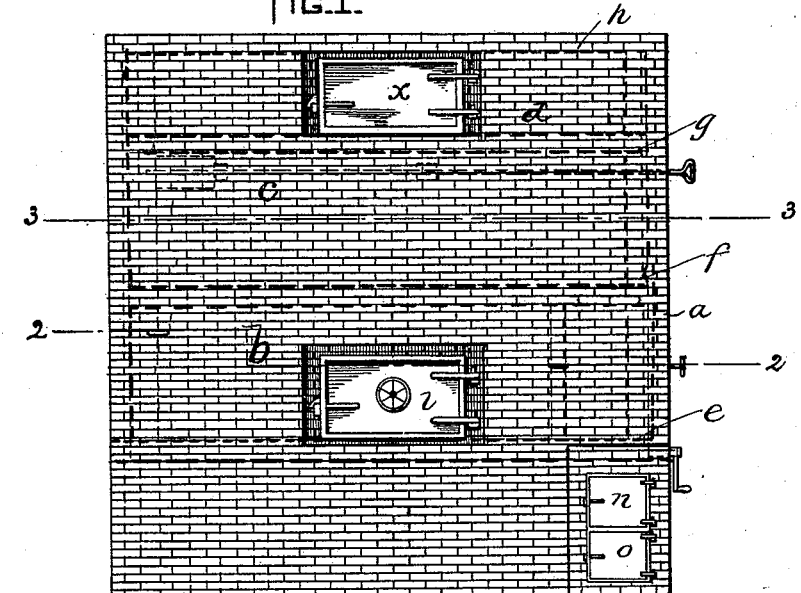
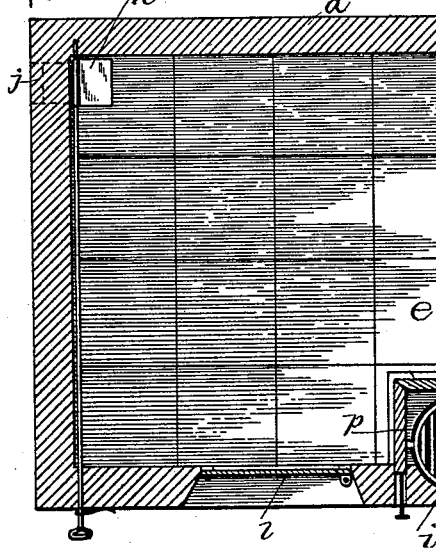
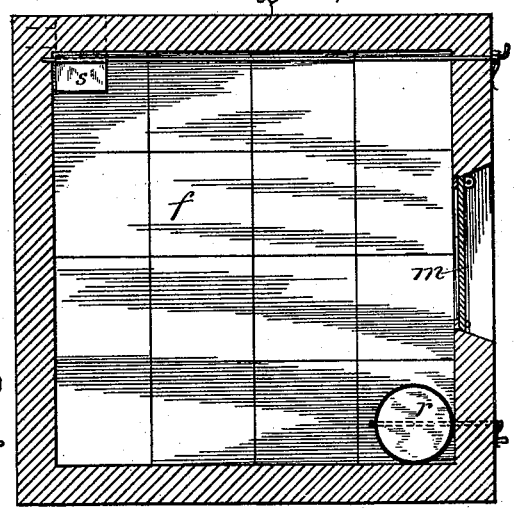
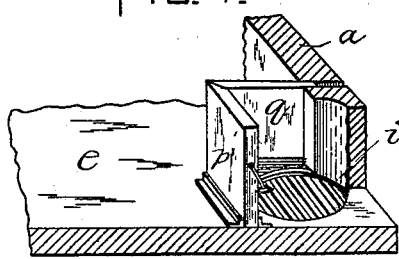
WITNESSES:
INVENTOR:
A. D. Ordway

UNITED STATES PATENT OFFICE.

ARTHUR DANA ORDWAY, OF NEWBURYPORT, MASSACHUSETTS.

BAKER'S OVEN.

SPECIFICATION forming part of Letters Patent No. 475,045, dated May 17, 1892.

Application filed July 13, 1891. Serial No. 399,292. (No model.)

*To all whom it may concern:*

Be is known that I, ARTHUR DANA ORDWAY, of Newburyport, in the county of Essex and State of Massachusetts, have invented certain new and useful Improvements in Bakers' Ovens, of which the following is a specification.

The improvements have relation to bakers' ovens, whether stationary or portable, and have for their object the avoidance of objectionable results from undue heat and the utilization of the surplus heat in one oven or compartment for the heating of another or other ovens or compartments.

Heretofore ovens have been most commonly constructed with a single compartment, which has been heated by a fire on a grate located in one corner of said compartment. The fuel has been fed through the oven-door and the products of combustion passed through the compartment and out at some point opposite the grate. It not infrequently happened that when a "batch" of baking was placed in the oven the fire on the grate was unduly hot, so that the alternative was presented of burning or scorching the baking or dumping the fire from the grate, the latter thing necessitating the rebuilding of the fire and consequent loss of time.

To avoid these objections and attain the advantages mentioned in the statement of the objects of my improvements, the invention consists of an oven having two or more compartments, the additional compartment or compartments being arranged above the compartment provided with the grate, the lower compartment being provided with dampers or removable partitious for shutting off the heat from the grate to said lower compartment, and a damper being provided in the crown of the lower compartment and hearth of the compartment next above over the grate for admitting the heat from the fire on the grate to said upper compartment when shut off from the lower compartment. I may also form a baking-compartment above the two compartments just described, which may be heated by the heat in the intermediate compartment.

Reference is to be had to the annexed drawings, and to the letters marked thereon, forming a part of this specification, the same letters designating the same parts or features, as the case may be, wherever they occur.

In the drawings, Figure 1 is a diagram representing a front view of my improved oven. Fig. 2 is a sectional view taken on the line 2 2 of Fig. 1. Fig. 3 is a horizontal sectional view taken on the line 3 3 of Fig. 1. Fig. 4 is a perspective detail view showing the dampers or removable partitions for shutting off the heat from the grate to the lower compartment.

In the drawings, $a$ designates the walls of the oven, which may be of any character suited to the purpose and meeting the requirements of a stationary, portable, or other kind of oven to which my improvements may be applied.

The several compartments of the improved oven are indicated by dotted lines in Fig. 1, $b$ being the lower compartment, $c$ the intermediate compartment, and $d$ the top or upper compartment.

$e$ designates the hearth of the lower compartment; $f$, the crown of the lower and hearth of the intermediate compartment, which may not be over sixteen inches above the hearth $e$; $g$, the crown of the intermediate and hearth of the upper compartment, which may not be over sixteen inches above the hearth $g$, and $h$ the crown of the latter compartment.

$i$ is the grate, arranged in one corner of the lower compartment, from which compartment the products of combustion may pass through the exit-port $j$ (indicated by dotted lines in Fig. 2) to the pipe, chimney, or other flue. The port $j$ is controlled by a suitable damper $k$.

$l$ is a door admitting to the lower compartment, and $m$ is a similar door preferably, though not necessarily, on a different side of the oven from the door $l$, admitting to the intermediate compartment.

$n$ $o$ are doors admitting to the cinder and ash pits or grates below the grate $i$.

$p$ $q$ designate removable partitions or dampers arranged when placed in position to extend between the hearth and crown of the lower compartment and from the walls on the opposite sides of the grate to a point of meeting, which may be diagonally opposite the corner of the oven in which the grate is placed, as is shown in Figs. 2 and 4, so as to cut off communication, if need be, between the grate and the lower compartment. As herein shown, the removable partitions $p\ q$ are made to slide in ways formed on the hearth and crown of the lower compartment; but it will be understood that this precise manner of arranging and operating the said partitions is not essential, and it would meet the requirements of my invention if portions of the partitions $p\ q$ were made stationary.

$r$ designates a damper arranged on or in an aperture formed in the crown of compartment $b$ and hearth of compartment $c$ over the grate $i$, so that the said aperture may be fully or partially opened or closed at pleasure. A damper of any form and construction capable of accomplishing the functions mentioned will answer the purpose.

An exit-flue controlled by the damper $s$, similar in construction and function to the damper $k$, provides for the escape of products of combustion entering the intermediate compartment.

A door $x$ may be provided at any suitable point (herein shown as in the front of the oven) for gaining access to the top compartment.

In the use of my invention a fire may be kindled on the grate, and, with the damper $r$ closed, may be kept burning until the lower compartment is sufficiently heated, and it may be wanted to put material into said compartment to be baked and to shut off the fire therefrom. The damper $k$ may now be closed and the damper $r$ opened, which will admit all of the heat from the fire to the intermediate compartment, and not only heat the same to the desired extent, but heat the top compartment to a sufficient degree to bake cake, brown bread, beans, and many other articles. While the heating of the top compartment is being accomplished the batch of baking in the lower compartment will be protected against undue heat and the fire on the grate will be preserved, so as to make rekindling unnecessary. It will be understood, of course, that when the damper $k$ is closed the dampers $r$ and $s$ may be opened, so as to permit the escape of the products of combustion through the intermediate compartment and the part controlled by the damper $s$; or when the damper $k$ is closed the door $n$ may be opened to allow the products of combustion to escape therethrough.

The dampers $p\ q$ may be of tile or iron; and the damper $r$ may also be of tile, as shown, and be made to tilt or be otherwise operated.

Another important advantage of my invention is that by closing the dampers $p\ q$ the fire may be preserved over night, a thing quite impossible to do where the fire lies on the grate in the open open.

My improved oven is excellently well adapted for use in hotels as well as bread-bakeries, since fish and like food may be baked in the lower oven, meats, &c., at the same time in the intermediate oven, and cake or pastry, also, at the same time in the upper oven.

Changes may be made in the form and arrangement of parts of the improvements without departing from the nature or spirit of the invention.

I claim as my invention—

1. A baker's oven comprising two or more compartments, one above the other, a single grate for a fire in the lower compartment, means for shutting off or admitting heat from the fire to the lower compartment, and means for shutting off and admitting heat from the fire to the compartment next above the lower compartment, as set forth.

2. A baker's oven provided with a compartment $b$, a grate for a fire on one corner of the said compartment, an exit-flue in the wall opposite said grate, an aperture above the grate, and a damper to control the same, and removable partitions or dampers $p\ q$ for shutting off communication between the grate and the said compartment, as set forth.

3. A baker's oven comprising three compartments, one above another, a single grate for a fire in the lower compartment, means for shutting off or admitting communication between the grate and the said compartment, means for shutting off or admitting communication between the grate and the intermediate compartment, and the top compartment heated by the heat in the intermediate compartment, as set forth.

In testimony whereof I have signed my name to this specification, in the presence of two subscribing witnesses, this 24th day of June, A. D. 1891.

ARTHUR DANA ORDWAY.

Witnesses:
ARTHUR W. CROSSLEY,
A. D. HARRISON.